(12) United States Patent
Takahashi et al.

(10) Patent No.: US 9,254,626 B2
(45) Date of Patent: Feb. 9, 2016

(54) BONDED OBJECT OF TUNGSTEN CARBIDE-BASED SUPERHARD ALLOY AND PROCESS FOR PRODUCING SAME

(71) Applicant: NGK INSULATORS, LTD., Nagoya (JP)

(72) Inventors: Hironori Takahashi, Nagoya (JP); Hiroyuki Tanaka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/027,509

(22) Filed: Sep. 16, 2013

(65) Prior Publication Data

US 2014/0017509 A1    Jan. 16, 2014

Related U.S. Application Data

(63) Continuation of application No. PCT/JP2012/056001, filed on Mar. 8, 2012.

(30) Foreign Application Priority Data

Mar. 25, 2011  (JP) .................................. 2011-067370

(51) Int. Cl.
*B32B 15/04* (2006.01)
*B23K 1/00* (2006.01)
(Continued)

(52) U.S. Cl.
CPC .............. *B32B 15/043* (2013.01); *B23K 1/0008* (2013.01); *B23K 20/00* (2013.01); *B23K 35/0233* (2013.01); *B23K 35/302* (2013.01); *B23P 15/243* (2013.01); *B28B 3/269* (2013.01); *B32B 15/04* (2013.01); *B32B 15/18* (2013.01); *C21D 1/18* (2013.01); *C21D 1/74* (2013.01);
(Continued)

(58) Field of Classification Search
None
See application file for complete search history.

(56) References Cited

U.S. PATENT DOCUMENTS 5,770,322 A * 6/1998 Nishioka et al. .............. 428/627
5,993,978 A * 11/1999 Kim et al. ...................... 428/553
(Continued)

FOREIGN PATENT DOCUMENTS

CN    101139692 A    3/2008
CN    101338358 A    1/2009
(Continued)

OTHER PUBLICATIONS

STIC search report for U.S. Appl. No. 14/027,509.*
(Continued)

*Primary Examiner* — Humera Sheikh
*Assistant Examiner* — Seth Dumbris
(74) *Attorney, Agent, or Firm* — Burr & Brown, PLLC

(57) ABSTRACT

The present invention provides a bonded tungsten carbide-based super hard alloy assembly equipped with a first metal member comprised of a steel material having a martensite structure, and defining a first bonding surface and a second metal member comprised of a tungsten carbide-based super hard alloy and defining a second bonding surface directly bonded to the first bonding surface of the first metal member. The martensite structure-containing steel material constituting the first metal member is a stainless steel having an average carbon concentration of 0.10 to 0.40 mass %. The first metal member has a high carbon concentration region at a depth ranging from 0.70 to 3.00 mm from the first bonding surface. The high carbon concentration region has a maximum carbon concentration of 0.3 to 1.2 mass %.

7 Claims, 4 Drawing Sheets

(51) Int. Cl.
  *B23K 20/00*  (2006.01)
  *B23P 15/24*  (2006.01)
  *B28B 3/26*   (2006.01)
  *B32B 15/18*  (2006.01)
  *C22C 38/02*  (2006.01)
  *C22C 38/04*  (2006.01)
  *C22C 38/18*  (2006.01)
  *B23K 35/30*  (2006.01)
  *B23K 35/02*  (2006.01)
  *C21D 1/74*   (2006.01)
  *C21D 1/18*   (2006.01)
  *C23C 8/20*   (2006.01)
  *C23C 8/80*   (2006.01)
  *C22C 29/08*  (2006.01)

(52) U.S. Cl.
  CPC ............... *C22C 38/02* (2013.01); *C22C 38/04* (2013.01); *C22C 38/18* (2013.01); *C23C 8/20* (2013.01); *C23C 8/80* (2013.01); *B22F 2998/00* (2013.01); *B23K 2201/02* (2013.01); *B23K 2201/20* (2013.01); *B23K 2203/04* (2013.01); *B23K 2203/16* (2013.01); *B23K 2203/18* (2013.01); *B32B 2307/536* (2013.01); *C21D 2211/008* (2013.01); *C22C 29/08* (2013.01); *C22C 2204/00* (2013.01); *Y10T 428/1234* (2015.01); *Y10T 428/1284* (2015.01)

(56) References Cited

U.S. PATENT DOCUMENTS

| 2006/0034972 A1 | 2/2006 | Takahashi et al. |
| 2009/0232927 A1 | 9/2009 | Takahashi et al. |
| 2010/0074982 A1* | 3/2010 | Takahashi .................... 425/464 |

FOREIGN PATENT DOCUMENTS

| CN | 101537658 A   |   | 9/2009  |              |
| JP | 08259341 A    | * | 10/1996 | ............. C04B 37/02 |
| JP | 2002-001716 A1 |   | 1/2002  |              |
| JP | 2002-361443 A1 |   | 12/2002 |              |
| JP | 2006-51682 A  |   | 2/2006  |              |
| JP | 2006-088556 A1 |   | 4/2006  |              |
| JP | 2007-181976 A1 |   | 7/2007  |              |
| JP | 2009-009802 A1 |   | 1/2009  |              |
| JP | 2011-051322 A1 |   | 3/2011  |              |

OTHER PUBLICATIONS

International Search Report and Written Opinion dated Jun. 12, 2012.

Chinese Office Action (With English Translation), Chinese Application No. 201280012838.1, dated Feb. 12, 2015 (15 pages).

* cited by examiner ial member is a stainless steel, while the second plate-shaped member is made of a tungsten carbide-based super hard alloy. By using this method, the first plate-shaped member made of a stainless steel and the second plate-shaped member made of a tungsten carbide-based super hard alloy are bonded firmly. When a ceramic raw material was extruded through a honeycomb body forming die, however, a high pressure was applied to the honeycomb body forming die so that the die was required to have firm bonding strength and at the same time, excellent mechanical properties.

BONDED OBJECT OF TUNGSTEN CARBIDE-BASED SUPERHARD ALLOY AND PROCESS FOR PRODUCING SAME

BACKGROUND OF THE INVENTION

1. Field of the Invention

The present invention relates to a bonded tungsten carbide-based super hard alloy assembly and a process for producing the same. More specifically, the invention relates to a bonded tungsten carbide-based super hard alloy assembly having high bonding strength and excellent mechanical properties and a process for producing the same.

2. Description of Related Art

Bonded assemblies of a tungsten carbide-based super hard alloy and a stainless steel have conventionally been used for dies for forming a ceramic honeycomb body (honeycomb body forming dies), precision molds, dies, plugs, and the like.

As honeycomb body forming dies, those produced using the following process can be given as an example (refer to, for example, Patent Document 1). First, a plurality of back holes is formed in a first plate-shaped member so that they are opened on at least one surface side thereof. The other surface side of the first plate-shaped member and a second plate-shaped member are bonded to each other by hot pressing while inserting therebetween copper or the like as a brazing filler metal. Then, slits are formed in the second plate-shaped member in lattice form so as to be associated with the back holes formed in the first plate-shaped member. A honeycomb body forming die is thus obtained. The back holes are usually provided at a position corresponding to (overlapping with) an intersection of the lattice of the slits formed in lattice form. When a honeycomb body is obtained using the ceramic honeycomb body forming die as described in Patent Document 1, honeycomb body forming raw materials containing ceramic raw materials are introduced from the back holes. The honeycomb body forming raw materials are transferred from the back holes having a relatively large inner diameter to the narrow slits and extruded as a formed body with a honeycomb structure from the opening portion of the slits. Thus, the slit portions of the second plate-shaped member are narrow and a high pressure is applied thereto during passage of the honeycomb body forming raw materials so that they are likely to be worn. In the honeycomb body forming die as described in Patent Document 1, therefore, the second plate-shaped member is made of a tungsten carbide-based super hard alloy with high abrasion resistance. The first plate-shaped member is not required to have abrasion resistance as high as the second plate-shaped member so that it is made of a stainless steel. The honeycomb body is fired into a honeycomb structure and the fired one is used as a filter, catalyst carrier, or the like for purifying an exhaust gas of automobiles, and the like.

PRIOR ART DOCUMENT

Patent Document

Patent Document 1: JP-A-2007-181976

As described above, in the honeycomb body forming die as described in Patent Document 1, the first plate-shaped member and the second plate-shaped member have been bonded under pressure and heating to each other while having therebetween a copper foil as a brazing filler metal. The first plate-shaped member is made of a stainless steel, while the second plate-shaped member is made of a tungsten carbide-based super hard alloy. By using this method, the first plate-shaped member made of a stainless steel and the second

SUMMARY OF THE INVENTION

The present invention has been made in consideration of such a problem of the background art. The present invention is characterized in that it provides a bonded tungsten carbide-based super hard alloy assembly having high bonding strength and excellent mechanical properties and a process for producing the same.

The following bonded tungsten carbide-based super hard alloy assembly and process for producing the same are provided by the present invention.

According to a first aspect of the present invention, a bonded tungsten carbide-based super hard alloy assembly (a first bonded tungsten carbide-based super hard alloy assembly) is provided, equipped with a first metal member having a first bonding surface and comprising a steel material containing a martensite structure and a second metal member having a second bonding surface which has been directly bonded to the first bonding surface of the first metal member and comprising a tungsten carbide-based super hard alloy, wherein the martensite structure-containing steel material constituting the first metal member is a stainless steel having an average carbon concentration of 0.10 to 0.40 mass %, and the first metal member has, at a depth thereof ranging 0.70 to 3.00 mm from the first bonding surface, a high carbon concentration region, the high carbon concentration region having the maximum carbon concentration of 0.3 to 1.2 mass %.

According to a second aspect of the present invention, a bonded tungsten carbide-based super hard alloy assembly (a second bonded tungsten carbide-based super hard alloy assembly) is provided, equipped with a first metal member having a first bonding surface and comprising a steel material containing a martensite structure and a second metal member having a second bonding surface which has been directly bonded to the first bonding surface of the first metal member and comprising a tungsten carbide-based super hard alloy, wherein the martensite structure-containing steel material constituting the first metal member further contains at least one element selected from the group consisting of Ti, Nb, Mo, Ta, V, W, and Zr; and the first metal member has, at a depth thereof ranging from 0.70 to 3.00 mm from the first bonding surface, a high carbon concentration region, the high carbon concentration region having the maximum carbon concentration of from 0.55 to 1.7 mass %.

According to a third aspect, the bonded tungsten carbide-based super hard alloy assembly as described in the first or second aspects above is provided, wherein the first metal member is a first plate-shaped member having therein a back hole serving as a through-hole for introducing a forming raw material and the second metal member is a second plate-shaped member having slits in lattice form communicated with the back hole for forming the forming raw material into a honeycomb shape.

According to a fourth aspect, a honeycomb body forming die equipped with the bonded tungsten carbide-based super hard alloy assembly as described in the third aspect above is provided.

According to a fifth aspect of the present invention, a process for producing a bonded tungsten carbide-based super hard alloy assembly (a process for producing a first bonded tungsten carbide-based super hard alloy assembly) is provided, including causing carbon to enter a first metal member, which has a first bonding surface and comprises a stainless steel containing a martensite structure and having an average carbon concentration of 0.10 to 0.40 mass %, from at least a portion of the first bonding surface of the first metal member to form a high carbon concentration region having the maximum carbon concentration of 0.15 to 1.3 mass % at a depth of the first metal member ranging from 0.3 to 2.0 mm from the first bonding surface thereof; laminating the first metal member and a second metal member having a second bonding surface and comprised of a tungsten carbide-based super hard alloy one after another so that the first bonding surface and the second bonding surface face to each other while inserting therebetween a brazing filler metal capable of penetrating in the first metal member or the second metal member; pressing the laminated members under a pressure of 0.1 to 5 MPa at a temperature of 700 to 1200° C. to bond the first metal member and the second metal member to each other while allowing the brazing filler metal to penetrate into the first metal member or the second metal member; and then cooling to 500° C. or less at an average cooling rate of 1 to 50° C./min to produce the bonded tungsten carbide-based super hard alloy assembly.

According to a sixth aspect of the present invention, a process for producing a bonded tungsten carbide-based super hard alloy assembly (a process for producing a second bonded tungsten carbide-based super hard alloy assembly) is provided, including causing carbon to enter a first metal member, which has a first bonding surface and comprising a steel material containing a martensite structure and further containing at least one element selected from the group consisting of Ti, Nb, Mo, Ta, V, W, and Zr, from at least a portion of the first bonded surface of the first metal member to form a high carbon concentration region having the maximum carbon concentration of 0.35 to 1.7 mass % in the first metal member at a depth thereof ranging from 0.3 to 2.0 mm from the first bonding surface; laminating the first metal member and a second metal member having a second bonding surface and comprised of a tungsten carbide-based super hard alloy one after another so that the first bonding surface and the second bonding surface face to each other while inserting therebetween a brazing filler metal capable of penetrating through the first metal member or the second metal member; pressing the laminated members at a temperature of 700 to 1200° C. under a pressure of 0.1 to 5 MPa to bond the first metal member and the second metal member to each other while allowing the brazing filler metal to penetrate into the first metal member or the second metal member; and then cooling to 500° C. or less at an average cooling rate of 1 to 50° C./min.

The bonded tungsten carbide-based super hard alloy assembly (first bonded tungsten carbide-based super hard alloy assembly) according to the present invention has a high carbon concentration region "at a depth ranging from 0.70 to 3.00 mm from the first bonding surface" of the first metal member comprised of a steel material containing a martensite structure. The steel material containing a martensite structure is a stainless steel having an average carbon concentration of from 0.10 to 0.40 mass and the maximum carbon concentration in the high carbon concentration region is from 0.3 to 1.2 mass %. When the first metal member and the second metal member are bonded to each other, therefore, penetration of carbon contained in the "super hard alloy constituting the second member" into the first metal member is suppressed. This makes it possible to suppress embrittlement of the super hard alloy and the resulting bonded tungsten carbide-based super hard alloy assembly is able to have high bonding strength. Moreover, the high carbon concentration region is positioned "at a depth ranging from 0.7 to 3.0 mm from the first bonding surface" of the first metal member. The other region of the first metal member is a martensite structure-containing steel material (having a normal carbon concentration which a martensite structure-containing steel material has). It can therefore keep high strength and toughness without causing deterioration in mechanical properties which will otherwise occur due to a high carbon content.

The bonded tungsten carbide-based super hard alloy assembly (second bonded tungsten carbide-based super hard alloy assembly) according to the present invention has a high carbon concentration region "at a depth ranging from 0.70 to 3.00 mm from the first bonding surface" of the first metal member comprised of a steel material containing a martensite structure. The steel material (specific material) containing a martensite structure further contains at least one element selected from the group consisting of Ti, Nb, Mo, Ta, V, W, and Zr and the maximum carbon concentration in the high carbon concentration region is from 0.55 to 1.7 mass %. When the first metal member and the second metal member are bonded to each other, therefore, penetration of carbon contained in the "super hard alloy constituting the second metal member" into the first metal member is suppressed. This makes it possible to suppress embrittlement of the super hard alloy and the resulting bonded tungsten carbide-based super hard alloy assembly is able to have high bonding strength. Moreover, the high carbon concentration region is positioned "at a depth ranging from 0.7 to 3.0 mm from the first bonding surface" of the first metal member. The other region of the first metal member is a martensite structure-containing steel material (having a usual carbon concentration which a martensite structure-containing steel material has). It can therefore keep high strength and toughness without causing deterioration in mechanical properties which will otherwise occur due to a high carbon content.

The process for producing a bonded tungsten carbide-based super hard alloy assembly (a first bonded tungsten carbide-based super hard alloy assembly) according to the present invention is as follows. Described specifically, first, carbon is caused to enter the first metal member from the first bonding surface to form a high carbon concentration region (maximum carbon concentration: from 0.15 to 1.3 mass %) at a depth of the first metal member ranging from 0.3 to 2.0 mm from the first bonding surface thereof. The first metal member has the first bonding surface and is comprised of a stainless steel containing a martensite structure and having an average carbon concentration of from 0.10 to 0.40 mass %. The first metal member and the second metal member are then laminated one after another so that "the first bonding surface and the second bonding surface face to each other while having therebetween "a brazing filler metal" capable of penetrating through the first metal member or the second metal member". The second metal member has the second bonding surface and comprised of a tungsten carbide-based super hard alloy. Then, the first metal member and the second metal member thus laminated are pressed at a temperature of from 700 to 1200° C. under a pressure of from 0.1 to 5 MPa, by which the first metal member and the second metal member are bonded to each other while allowing the brazing filler metal to penetrate into the first metal member or the second metal member. During bonding, they are cooled to 500° C. or less at an average cooling rate of from 1 to 50° C./min to form a bonded assembly. This process therefore makes it possible to produce a bonded tungsten carbide-based super hard alloy assembly having high bonding strength and excellent mechanical strength.

The process for producing a bonded tungsten carbide-based super hard alloy assembly (a second bonded tungsten carbide-based super hard alloy assembly) according to the present invention is as follows. Described specifically, carbon is caused to enter the first metal member from the first bonding surface to form a high carbon concentration region (maximum carbon concentration: from 0.35 to 1.7 mass %) at a depth of the first metal member ranging from 0.3 to 2.0 mm from the first bonding surface thereof. The first metal member has the first bonding surface and comprised of a steel material containing a martensite structure and further containing at least one element selected from the group consisting of Ti, Nb, Mo, Ta, V, W, and Zr. Then the first metal member and the second metal member are laminated one after another so that "the first bonding surface and the second bonding surface face to each other while having therebetween a "brazing filler metal" capable of penetrating into the first metal member or the second metal member". The second metal member has the second bonding surface and is comprised of a tungsten carbide-based super hard alloy. Then, the first metal member and the second metal member thus laminated are pressed at a temperature of from 700 to 1200° C. under a pressure of from 0.1 to 5 MPa, by which the first metal member and the second metal member are bonded to each other while allowing a brazing filler metal to penetrate into the first metal member or the second metal member. During bonding, they are cooled to 500° C. or less at an average cooling rate of from 1 to 50° C./min to obtain a bonded assembly. This process therefore makes it possible to produce a bonded tungsten carbide-based super hard alloy assembly having high bonding strength and excellent mechanical strength.

DETAILED DESCRIPTION OF THE INVENTION

Modes for carrying out the present invention will hereinafter be described specifically referring to drawings. It should be understood that the present invention is not limited to or by the following modes but the design of it may be changed, improved, or the like as needed based on the conventional knowledge of those skilled in the art without departing from the gist of the present invention.

Figure 1:
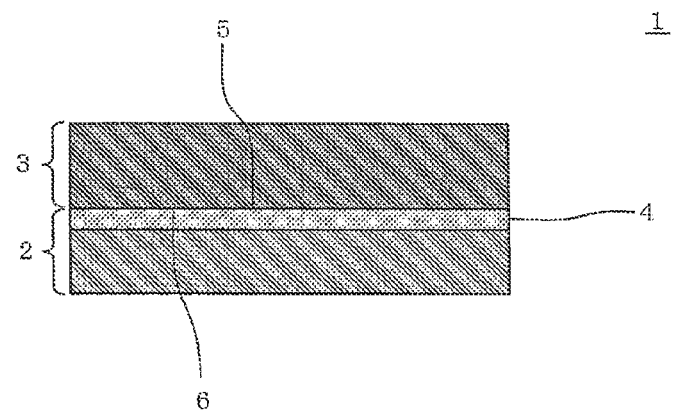
FIG. 1 is a schematic view showing one embodiment of the bonded assembly of the present invention and showing the cross-section perpendicular to the first bonding surface of the first metal member.

(1) Bonded Tungsten Carbide-Based Super Hard Alloy Assembly (1-1) First Bonded Tungsten Carbide-Based Super Hard Alloy Assembly As shown in FIG. 1, the following is one embodiment of the bonded tungsten carbide-based super hard alloy assembly (first bonded tungsten carbide-based super hard alloy assembly) of the present invention. Described specifically, the bonded tungsten carbide-based super hard alloy assembly according to the present embodiment is equipped with a first metal member 2 having a first bonding surface 5 and a second metal member 3 having a second bonding surface 6, the "second bonding surface 6 having been directly bonded to the first bonding surface 5 of the first metal member 2". The first metal member 2 is comprised of a steel material containing a martensite structure. The second metal member 3 is comprised of a tungsten carbide-based super hard alloy (which may be called "super hard alloy" simply). The "martensite structure-containing steel material" constituting the first metal member is a stainless steel having an average carbon concentration of from 0.10 to 0.40 mass %. The "martensite structure-containing steel material" constituting the first metal member has a high carbon concentration region 4 at a depth of the first metal member 2 ranging from 0.70 to 3.00 mm from the first bonding surface 5. The maximum carbon concentration in the high carbon concentration region 4 is from 0.3 to 1.2 mass %. The term "having a high carbon concentration region 4 at a depth ranging from 0.70 to 3.00 mm from the first bonding surface 5" means that the high carbon concentration region 4 lies within a range of a predetermined depth from the first bonding surface 5 and the possible predetermined depth ranges from 0.7 to 3.0 mm. FIG. 1 shows one embodiment of the bonded tungsten carbide-based super hard alloy assembly of the present invention and is a schematic view showing a cross-section perpendicular to the first bonding surface 5 of the first metal member 2.

In the bonded tungsten carbide-based super hard alloy assembly 1 according to the present embodiment, a region at the "depth ranging from 0.7 to 3.0 mm from the first bonding surface 5" of the first metal member 2 comprised of a steel material containing a martensite structure is, as described above, the high carbon concentration region 4. When the first metal member and the second metal member are bonded to each other, therefore, penetration of carbon contained in the "super hard alloy constituting the second metal member" into the first metal member is suppressed. As a result, embrittlement of the super hard alloy is suppressed and the bonded tungsten carbide-based super hard alloy assembly is able to have high bonding strength. Moreover, the high carbon concentration region 4 lies "at a depth ranging from 0.7 to 3.0 mm from the first bonding surface 5" of the first metal member 2. Moreover, the region of the first metal member 2 other than the high carbon concentration region 4 is comprised of a martensite structure-containing steel material (having a normal carbon concentration which a martensite structure-containing steel material has). The first metal member 2 as a whole can therefore keep its high strength and toughness without causing deterioration in mechanical properties which will otherwise occur due to a high carbon content. As a result, the bonded assembly 1 as a whole can keep its high mechanical properties. It is to be noted that when the first metal member 2 is bonded to a tungsten carbide-based super hard alloy, it has preferably undergone martensite transformation as a result of cooling after heating to an austenite transformation temperature or greater.

The term "bonding strength" as used herein means "strength preventing separation between the first metal member and the second metal member against an external force or a thermal stress which occurs due to a difference in thermal expansion therebetween". The term "mechanical properties" means yield strength, hardness, toughness, fatigue characteristics, and the like. They can be evaluated by measuring hardness, measuring Charpy impact strength, observing the metal texture, and the like.

In the bonded tungsten carbide-based super hard alloy assembly (first bonded tungsten carbide-based super hard alloy assembly) 1 according to the present embodiment, the term "tungsten carbide-based super hard alloy" means an alloy obtained by sintering tungsten carbide and a bonding material. The bonding material is preferably at least one metal selected from the group consisting of cobalt (Co), iron (Fe), nickel (Ni), titanium (Ti), and chromium (Cr), with cobalt being particularly preferred. Such a tungsten carbide-based super hard alloy is particularly excellent in abrasion resistance and mechanical strength. Moreover, such a tungsten carbide-based super hard alloy can increase the bonding strength with the first metal member.

In the bonded tungsten carbide-based super hard alloy assembly (first bonded tungsten carbide-based super hard alloy assembly) 1 according to the present embodiment, the first metal member 2 contains a martensite structure. The first metal member 2 is comprised of a stainless steel having an average carbon concentration of from 0.10 to 0.40 mass %. Moreover, as the first metal member 2, that containing a martensite structure in an amount of 20 mass % or greater is preferred and that containing a martensite structure in an amount of 50 mass or greater is more preferred. As the first metal member 2, that containing a martensite structure in an amount of 80 mass or greater is most preferred.

The first metal member 2 has the high carbon concentration region 4 at a depth ranging from 0.70 to 3.00 mm from the first bonding surface 5. In other words, "the thickness of the high carbon concentration region falls within a range of from 0.70 to 3.00 mm". Moreover, the first metal member has the high carbon concentration region 4 preferably at a depth ranging from 0.70 to 2.00 mm from the first bonding surface 5. The first metal member has the high carbon concentration region 4 more preferably at a depth ranging from 0.90 to 1.50 mm from the first bonding surface 5. The first metal member has the high carbon concentration region 4 particularly preferably at a depth ranging from 0.90 to 1.20 mm from the first bonding surface 5. By increasing the carbon concentration in the vicinity of the first bonding surface 5 as described above, it is possible to suppress diffusion of carbon to the first metal member from the second metal member comprised of a super hard alloy during bonding of the first bonding surface 5 to the second bonding surface 6 of the second metal member 3. In addition, it is possible to suppress a decrease in carbon amount in the super hard alloy constituting the second metal member, thereby suppressing deterioration (embrittlement) of the super hard alloy. As a result, the first metal member 2 and the second metal member 3 can be bonded to each other with improved bonding strength. The thickness of the high carbon concentration region 4 smaller (thinner) than 0.70 mm from the first bonding surface 5 is not preferred because it is less effective for improving the bonding strength between the first metal member 2 and the second metal member 3. The thickness of the high carbon concentration region 4 greater (thicker) than 3.00 mm from the first bonding surface 5 is not preferred because it leads to a drastic cost increase and deterioration in the mechanical properties of the first metal member 2.

In the bonded tungsten carbide-based super hard alloy assembly according to the present embodiment, the "martensite structure-containing steel material constituting the first metal member" is a stainless steel having an average carbon concentration of from 0.10 to 0.40 mass %. The "martensite structure-containing steel material constituting the first metal member" is a stainless steel having an average carbon concentration of preferably from 0.12 to 0.32 mass %. It is a stainless steel having an average carbon concentration of more preferably from 0.12 to 0.20 mass %. Moreover, the maximum carbon concentration of the high carbon concentration region is from 0.3 to 1.2 mass %, preferably from 0.3 to 0.45 mass %. This makes it possible to provide a bonded tungsten carbide super hard alloy assembly having high bonding strength, excellent corrosion resistance, and high mechanical strength. As the steel material constituting the first metal member, the following can be used. At least one (specific stainless steel) selected from the group consisting of SUS410, SUS403, SUS410J1, SUS420J1, SUS420J2, and SUS431 can be given as a preferred example. Of these, SUS403, SUS410J1, and SUS420J1 are particularly preferred. By selecting as described above, a bonded assembly having excellent mechanical strength and high corrosion resistance can be obtained.

The maximum carbon concentration of the high carbon concentration region 4 less than 0.3 mass % may reduce the effect of improving the bonding strength between the first metal member 2 and the second metal member 3. The maximum carbon concentration of the high carbon concentration region 4 greater than 1.2 mass may increase residual austenite and cause deterioration in hardness, mechanical properties, and corrosion resistance. The carbon concentration in the high carbon concentration region 4 preferably shows such a distribution that the concentration is higher at a position nearer the first bonding surface and a gradual concentration gradient is formed in the depth direction.

When the martensite structure-containing steel material constituting the first metal member is a specific stainless steel, the carbon concentration of the first metal member in a region (normal carbon concentration region) other than the high carbon concentration region is preferably from 0.1 to 0.4 mass %. When the region other than the high carbon concentration region has a carbon concentration less than 0.1 mass %, the first metal member having such a high carbon concentration region may have deteriorated mechanical properties such as deteriorated yield strength. When the region other than the high carbon concentration region has a carbon concentration exceeding 0.4 mass %, the first member having such a high carbon concentration region may have deteriorated toughness and corrosion resistance.

The "formation range of the high carbon concentration region 4" of the first bonding surface 5 of the first metal member 2 may be either the whole bonding surface 5 or a portion thereof.

The first metal member has a shape having a first bonding surface. More specifically, it has preferably a plate shape. When the first metal member has a plate shape, its thickness (length in a direction perpendicular to the first bonding surface) is preferably from 5 to 100 mm. When it has a thickness smaller than 5 mm, a proportion of it to the thickness of the high carbon concentration region becomes small. As a result, the first metal member is likely to have deteriorated mechanical properties. There occurs no particular trouble even if the first metal member in the bonded assembly of the present embodiment has an increased thickness, but thickness greater than 100 mm may increase the size and weight of the bonded assembly and is likely to cause separation of the bonded members due to thermal stress.

The area of the first bonding surface of the first metal member 2 is not particularly limited, but it is preferably from 1 to 250000 mm². When the area is smaller than 1 mm², such a small area may make it difficult to increase the bonding strength. When the area exceeds 250000 mm², such a large area may make it difficult to increase the bonding strength. The first bonding surface of the first metal member is a surface bonded to the second metal member.

In the bonded assembly 1 of the present embodiment, the second metal member 3 is a tungsten carbide-based super hard alloy containing tungsten carbide. The second metal member 3 contains tungsten carbide in an amount of preferably from 50 to 99 mass %, more preferably from 60 to 90 mass %.

The second metal member has a shape having a second bonding surface. More specifically, it has preferably a plate shape. When the second metal member has a plate shape, its thickness (length in a direction perpendicular to the second bonding surface) is preferably from 0.1 to 30 mm. The second metal member having a thickness smaller than 0.1 mm may be broken due to a thermal stress. There occurs no particular trouble even if the second bonding member in the bonded assembly of the present embodiment has an increased thickness, but thickness greater than 30 mm may cause separation due to thermal stress.

The area of the second bonding surface of the second metal member is not particularly limited, but it is preferably from 1 to 250000 mm². When the area of the second bonding surface is smaller than 1 mm², such a small area may make it difficult to increase the bonding strength. When the area of the second bonding surface exceeds 250000 mm², such a large area may make it difficult to achieve a stable bonding quality. The second bonding surface of the second metal member is a surface bonded to the first bonding surface of the first metal member.

In the bonded assembly 1 of the present embodiment, the first metal member or the second metal member may contain (or may have diffused therein) a "brazing filler metal" which has been sandwiched between the first metal member and the second metal member when the first metal member and the second metal member are bonded to each other. When a copper alloy (including pure copper) is used as the brazing filler metal, it has been diffused on the side of the first metal member, while when a cobalt alloy (including pure cobalt) is used as the brazing filler metal, it has been diffused on the side of the second metal member.

(1-2) Second Bonded Tungsten Carbide-Based Super Hard Alloy Assembly

One embodiment of the bonded tungsten carbide-based super hard alloy assembly (second bonded tungsten carbide-based super hard alloy assembly) according to the present invention is as follows. Described specifically, the bonded tungsten carbide-based super hard alloy assembly according to the present invention is equipped with a first metal member having a first bonding surface and a second metal member having a second bonding surface. The "second bonding surface has been directly bonded to the first bonding surface of the first metal member". The first metal member is comprised of a steel material containing a martensite structure. The second metal member is comprised of a tungsten carbide-based super hard alloy. The "martensite-containing steel material (specific material)" constituting the first metal member further contains at least one element selected from the group consisting of Ti, Nb, Mo, Ta, V, W, and Zr. Moreover, the bonded tungsten carbide-based super hard alloy assembly according to the present embodiment has, at a depth of the first metal member ranging from 0.70 to 3.00 mm from the first bonding surface thereof, a high carbon concentration region and the maximum carbon concentration of the high carbon concentration region is from 0.55 to 1.7 mass %.

The bonded tungsten carbide-based super hard alloy assembly (second bonded tungsten carbide-based super hard alloy assembly) according to the present embodiment is similar to the one embodiment of the bonded tungsten carbide-based super hard alloy assembly (first bonded tungsten carbide-based super hard alloy assembly) according to the present invention except that it should satisfy the following conditions. Described specifically, the steel material containing a martensite structure further contains at least one element selected from the group consisting of Ti, Nb, Mo, Ta, V, W, and Zr and the maximum carbon concentration in the high carbon concentration region is from 0.55 to 1.7 mass %. Conditions other than those described above are similar to those of one embodiment of the bonded tungsten carbide-based super hard alloy assembly (first bonded tungsten carbide-based super hard alloy assembly) according to the present invention. A steel material containing a martensite structure and at the same time containing at least one element selected from the group consisting of Ti, Nb, Mo, Ta, V, W, and Zr further will hereinafter be called "specific material".

In the bonded tungsten carbide-based super hard alloy assembly (second bonded tungsten carbide-based super hard alloy assembly) according to the present embodiment, a martensite structure-containing steel material constituting the first metal member is preferably the following material. At least one selected from the group consisting of heat resisting steel SUH, high speed tool steel SKH, alloy tool steel SKS, SKT, and SKD is preferred. The maximum carbon concentration of the high carbon concentration region is more preferably from 0.55 to 1.45 mass %. A bonded tungsten carbide super hard alloy assembly having high bonding strength and excellent mechanical properties can be obtained by selecting the material quality of the first metal member and regulating the maximum carbon concentration of the high carbon concentration region as described above. In this case, the maximum carbon concentration of the high carbon concentration region 4 smaller than 0.55 mass % may deteriorate the effect of improving the bonding strength between the first metal member 2 and the second metal member 3. The maximum carbon concentration of the high carbon concentration region 4 exceeding 1.7 mass % may provide a bonded assembly having an increased residual austenite content, reduced hardness, and deteriorated mechanical properties. The carbon concentration in the high carbon concentration region 4 has preferably such a distribution that the concentration is higher at a position nearer the first bonding surface and a concentration gradient becomes gradual with increasing distance from the bonding surface. In this case, the carbon concentration in a region (normal carbon concentration region) of the first metal member other than the high carbon concentration region is preferably from 0.15 to 0.6 mass %. The first member having, in the other region, a carbon concentration smaller than 0.15 mass % may have deteriorated mechanical properties such as deteriorated yield strength. The first member having, in the other region, a carbon concentration exceeding 0.6 mass % may have deteriorated toughness.

(2) Honeycomb Body Forming Die

Next, the honeycomb body forming die of the present invention will be described. The following is one embodiment of the honeycomb body forming die according to the present invention. The one embodiment of the bonded tungsten carbide-based super hard alloy assembly (first bonded tungsten carbide-based super hard alloy assembly) of the present invention will hereinafter be called "first embodiment". The one embodiment of the bonded tungsten carbide-based super hard alloy assembly (second bonded tungsten carbide-based super hard alloy assembly) of the present invention will hereinafter be called "second embodiment". The honeycomb body forming die of the present embodiment has, as shown in FIGS. 2 to 5, the following constitution in the first embodiment or second embodiment. Described specifically, the first metal member 2 is a first plate-shaped member 22 having back holes 24 which are through-holes for introducing a forming raw material. The second metal member 3 is a second plate-shaped member 23 having "slits 25 in lattice form which are communicated to the back holes 24 to form a forming raw material into a honeycomb shape". The honeycomb body forming die according to the present embodiment is equipped with a bonded assembly having a structure as described above. The honeycomb body forming die 100 according to the present embodiment may be comprised of the bonded assembly 21 or may include another element (for example, another metal member may be bonded).

Figure 2:
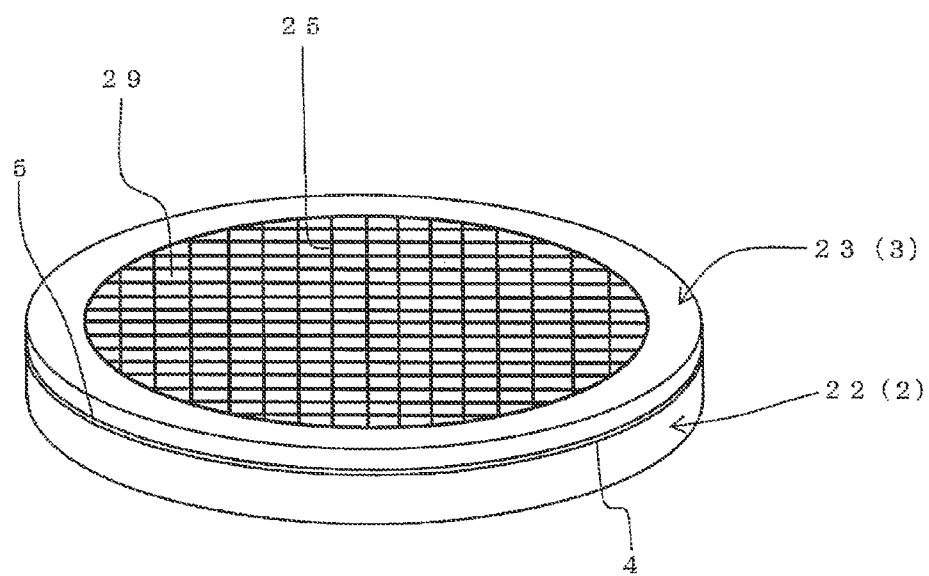
FIG. 2 is a perspective view schematically showing one embodiment of the honeycomb body forming die according to the present invention.
Figure 3:
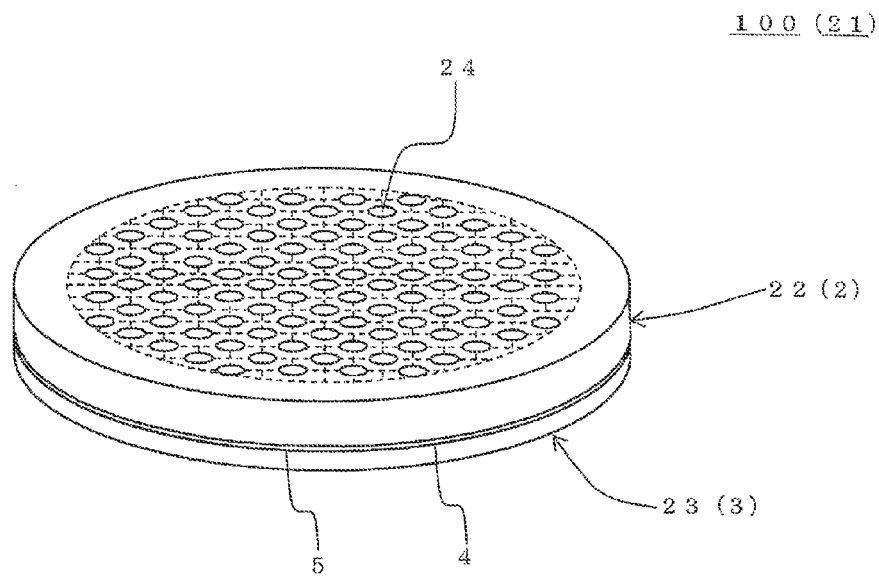
FIG. 3 is a perspective view schematically showing one embodiment of the honeycomb body forming die according to the present invention.
Figure 4:
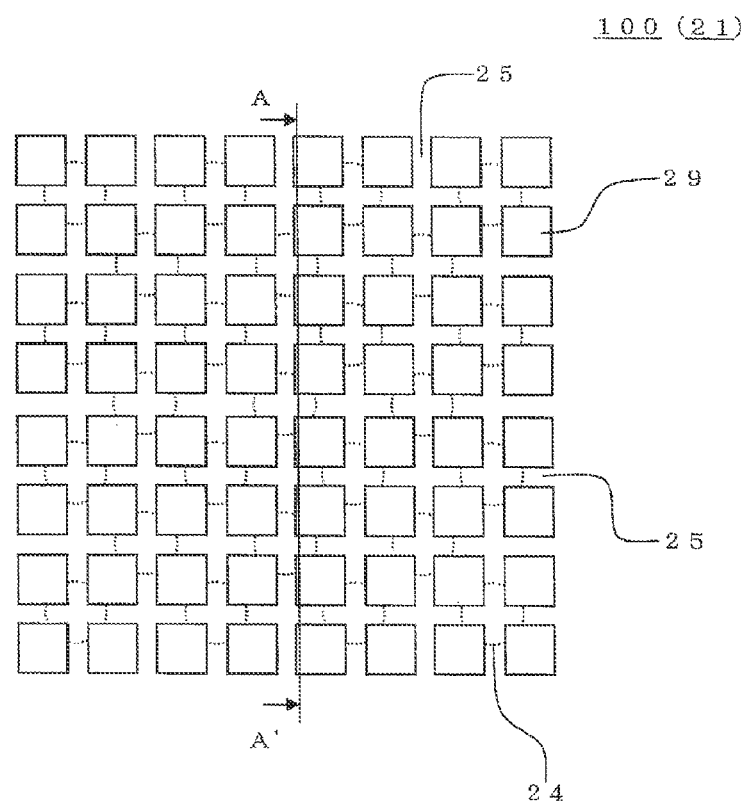
FIG. 4 is a partial plan view showing one embodiment of the honeycomb body forming die according to the present invention viewed from the side of the second plate-shaped member.
Figure 5:
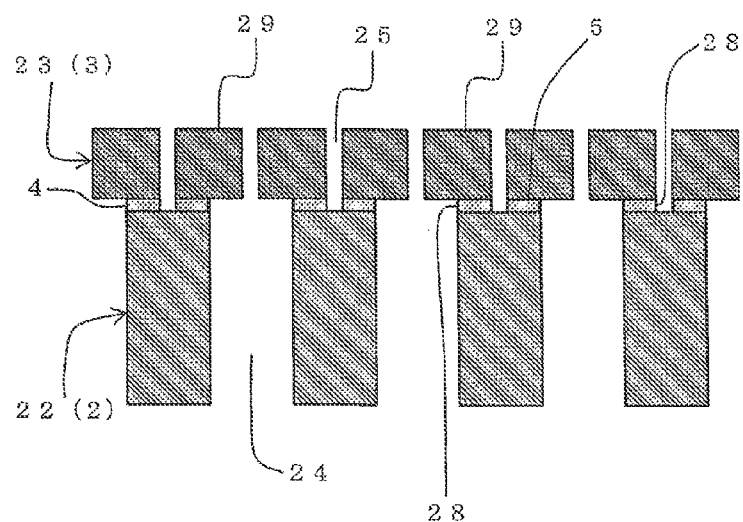
FIG. 5 is a schematic view showing the A-A' cross-section of FIG. 4.

FIG. 2 is a perspective view schematically showing one embodiment of the honeycomb body forming die of the present invention. FIG. 3 is a perspective view schematically showing one embodiment of the honeycomb body forming die of the present invention. FIG. 4 is a partial plan view of the one embodiment of the honeycomb body forming die of the present invention viewed from the side of the second plate-shaped member. FIG. 5 is a schematic view showing an A-A' cross-section of FIG. 4.

The honeycomb body forming die 100 according to the present embodiment has a constitution as described above so that it has both high bonding strength and excellent mechanical properties. Extrusion of a ceramic raw material by using the honeycomb body forming die of the present embodiment therefore produces the following effect. Described specifically, even a high pressure is applied to the honeycomb body forming die, separation between the first plate-shaped member (first metal member) and the second plate-shaped member (second metal member) can be prevented.

The honeycomb body forming die 100 shown in FIGS. 2 to 5 is comprised of the bonded assembly 21. The first metal member 2 of the bonded assembly 21 is a first plate-shaped member 22 having back holes 24 serving as through-holes for introducing a forming raw material. The second metal member 3 of the bonded assembly 21 is a second plate-shaped member 23 having slits 25 in lattice form which are communicated with the back holes 24 to extrude the forming raw material into a honeycomb shape. When the bonded assembly 21 is used as a honeycomb body forming die, the forming raw material of the honeycomb structure is introduced from the back holes 24.

The back holes 24 are formed so as to be placed at intersections of the slits 25 (in the honeycomb body forming die 100 shown in FIGS. 2 to 5, the back holes 24 are each formed at every other intersection of the intersections of the slits 25. When the bonded assembly 21 is used as a honeycomb body forming die, the forming raw material introduced from the back holes 24 enters the slits 25 and extruded from the opening portions of the slits 25 into a honeycomb-shaped formed body (honeycomb body).

The first plate-shaped member 22 has a plurality of columnar portions 28 defined by some of the slits 25 and the back holes 24. The honeycomb body forming die 100 of the present embodiment has, as described above, the columnar portions 28 on the side of the first bonding surface of the first plate-shaped member 22 so that the first plate-shaped member 22 and the second plate-shaped member 23 are bonded to each other via the columnar portions 28.

In the honeycomb body forming die 100 of the present embodiment, the second plate-shaped member 23 also contains a tungsten carbide-based super hard alloy (preferably, is a tungsten carbide-based super hard alloy) so that the abrasion of the slit 25 portion by the forming raw material during extrusion can be prevented.

The width of the slits 25 can be determined as needed, depending on the shape of a honeycomb body to be formed. For example, a honeycomb body forming die for extruding a honeycomb body with a conventional shape has a slit width of preferably from 5 to 5000 μm, more preferably from 10 to 500 μm. The distance between the slits 25 adjacent to each other can be determined as needed, depending on the shape of the honeycomb body to be formed.

As shown in FIGS. 2 to 5, the honeycomb body forming die 100 of the present embodiment has slits 25 and back holes 24 in a circular region at the center portion of the honeycomb body forming die 100. The region where the slits and the like are formed is not limited to the above-described one. For example, the honeycomb body forming die 100 may have slits and the like in a square, hexagonal, octagonal, or the like region at the center portion of the die.

No particular limitation is imposed on the shape of the back holes 24 of the honeycomb body forming die 100 insofar as it permits introduction of the forming raw material. The opening diameter and the like of the back holes 24 can be determined as needed, depending on the size of the honeycomb body forming die 100 or the shape of a honeycomb body to be extruded. For example, the opening diameter of the back holes 24 is preferably from 0.1 to 10 mm, more preferably from 0.5 to 3 mm. Such back holes 24 can be formed by a conventionally known method such as electrochemical machining (ECM), electrical discharge machining (EDM), laser processing, or machine processing with a drill or the like. The back holes 24 are formed in parallel to each other in the thickness direction of the first plate-shaped member 22.

The thickness of the first plate-shaped member 22 is preferably from 5 to 100 mm, more preferably from 10 to 50 mm. The first plate-shaped member having a thickness smaller than 5 mm may have deteriorated mechanical properties throughout the member because the proportion, in thickness, of the high carbon concentration region becomes high in the first plate-shaped member. The first plate-shaped member having a thickness greater than 100 mm, on the other hand, is likely to separate by a thermal stress when bonded to the second plate-shaped member and in addition, may show an increased pressure loss during extrusion of a forming raw material through the honeycomb body forming die. The thickness of the second plate-shaped member 23 is preferably from 0.1 to 10 mm, more preferably from 1 to 5 mm. The second plate-shaped member having a thickness less than 0.1 mm sometimes fails to extrude smoothly. The second plate-shaped member having a thickness greater than 10 mm, on the other hand, may show an increased pressure loss during extrusion of a forming raw material through the honeycomb body forming die. For the production of a honeycomb body forming die having a common shape, a ratio of the thickness of the first plate-shaped member 22 to the thickness of the second plate-shaped member 23 (thickness of the first plate-shaped member 22/thickness of the second plate-shaped member 23) is preferably from 0.1 to 200. A ratio of the thickness of the first plate-shaped member 22 to the thickness of the second plate-shaped member 23 is more preferably from 1 to 10.

The honeycomb body forming die can be used for forming a carrier for catalysts of internal combustion engines, boilers, chemical reaction apparatuses, reformers for fuel cells, and the like that use catalyst action or filters for collecting microparticles in an exhaust gas.

Figure 7A:
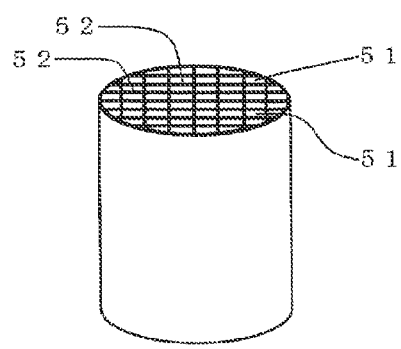
FIG. 7A is a perspective view schematically showing a honeycomb structure formed using the honeycomb body forming die of the present invention.
Figure 7B:
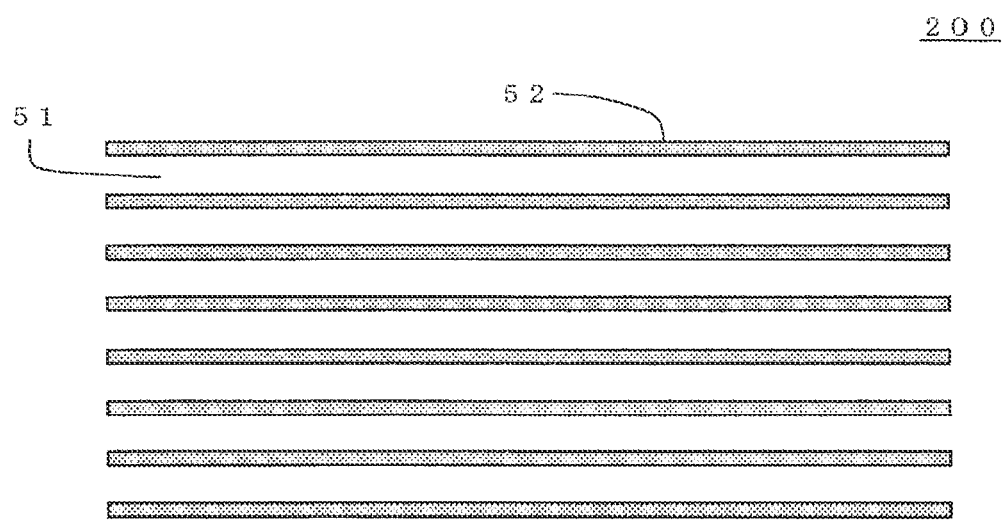
FIG. 7B is a schematic view showing the cross-section of a honeycomb structure formed using the honeycomb body forming die of the present invention.

By extruding a ceramic-containing raw material through the honeycomb body forming die thus obtained, a honeycomb body 200, as shown in FIGS. 7A and 7B, having a porous partition wall 52 for defining a plurality of cells 51 serving as through channels can be obtained. FIG. 7A is a perspective view schematically showing the honeycomb body 200 formed using the honeycomb body forming die of the present invention. FIG. 7B is a schematic view showing the cross-section of the honeycomb body 200 formed using the honeycomb body forming die of the present invention.

Figure 6:
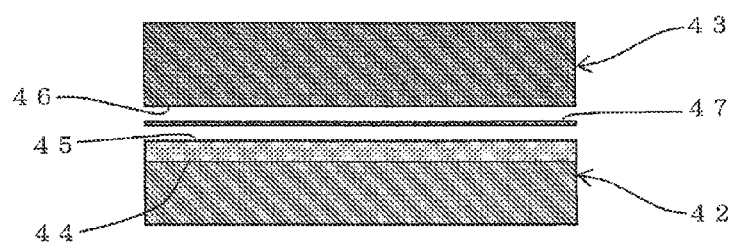
FIG. 6 is a schematic view showing, in one embodiment of the process for producing a bonded assembly according to the present invention, positions of the first metal member and the second metal member when they are laminated (overlapped) with the "brazing filler metal" inserted therebetween (when they are overlapped) and showing a cross-section perpendicular to the first bonding surface of the first metal member.

(3) Process for Producing a Bonded Tungsten Carbide-Based Super Hard Alloy Assembly (3-1) Process for Producing a First Tungsten Carbide-Based Super Hard Alloy Assembly One embodiment of the process for producing a bonded tungsten carbide-based super hard alloy assembly (first bonded tungsten carbide-based super hard alloy assembly) according to the present invention will next be described. The process for producing a tungsten carbide-based super hard alloy assembly according to the present embodiment is as follows. First, carbon is caused to enter a first metal member 42, which has a first bonding surface 45 and is comprised of a stainless steel containing a martensite structure and having an average carbon concentration of from 0.10 to 0.40 mass %, from at least a portion of the first bonding surface 45 to form a high carbon concentration region 44 having the maximum carbon concentration of from 0.15 to 1.3 mass % at a depth of the first metal member 42 ranging from 0.3 to 2.0 mm from the first bonding surface 45. Then, as shown in FIG. 6, the first metal member and a second metal member 43 having a second bonding surface 46 and comprised of a tungsten carbide-based super hard alloy are laminated one after another. The first metal member and the second metal member 43 are laminated so that they face to each other while having therebetween a "brazing filler metal" (copper foil) 47 capable of penetrating into the first metal member 42 or the second metal member 43. The lamination of the first metal member and the second metal member 43 is then pressed at a temperature of from 700 to 1200° C. under a pressure of from 0.1 to 5 MPa to bond the first metal member 42 and the second metal member 43 while allowing the brazing filler metal (copper foil) 47 to penetrate into the first metal member 42 or the second metal member 43. Then, the lamination of the first metal member and the second metal member 43 is cooled to 500° C. or less (until it becomes 500° C. or less) at an average cooling rate of from 1 to 50° C./min to produce a bonded tungsten carbide-based super hard alloy assembly. The above-mentioned one is the process for producing a bonded tungsten carbide-based super hard alloy assembly according to the present embodiment. The cooling rate after the temperature has decreased to less than 500° C. is not particularly limited. By this process, the one embodiment (refer to FIG. 1) of the bonded tungsten carbide-based super hard alloy assembly of the present invention can be obtained. FIG. 6 shows, in the one embodiment of the process for producing a bonded tungsten carbide-based super hard alloy assembly according to the present invention, the respective positions of the first metal member 42 and the second metal member 43 when they are laminated one after another (overlapped with each other). FIG. 6 shows that during laminating the first metal member 42 and the second metal member 43, they are laminated one after another while having therebetween the ""brazing filler metal 47" capable of penetrating into the first metal member 42 or the second metal member 43". FIG. 6 is a schematic view showing the cross-section perpendicular to the first bonding surface 45 of the first metal member 42. It is to be noted that the first metal member 42 undergoes austenite transformation when heated to from 700 to 1200° C., and then undergoes martensite transformation by cooling.

In the process for producing a bonded assembly according to the present embodiment, first, carbon is caused to enter a first metal member 42 having a first bonding surface 45 from at least a portion of the first bonding surface 45 to form a high carbon concentration region 44 at a depth of the first metal member 42 ranging from 0.3 to 2.0 mm from the first bonding surface 45. The first metal member 42 is comprised of a steel material containing a martensite structure. This makes it possible to improve the bonding strength between the first metal member and the second metal member. The high carbon concentration region is formed preferably to satisfy the respective preferable conditions of the high carbon concentration region in the bonded tungsten carbide-based super hard alloy assembly according to the one embodiment of the bonded assembly of the present invention. The high carbon concentration region satisfying the respective conditions can produce a similar effect to that of the one embodiment of the bonded assembly of the present invention. The maximum carbon concentration of the high carbon concentration region is from 0.15 to 1.3 mass %, preferably from 0.2 to 0.40 mass %. The carbon concentration is preferably high in the vicinity of the surface and has a concentration gradient which decreases gradually toward the depth direction. The high carbon concentration region is positioned at a depth ranging from 0.3 to 2.0 mm, preferably from 0.3 to 1.0 mm, each from the first bonding surface 45.

The "range where the high carbon concentration region 44 is to be formed" on the first bonding surface 45 of the first metal member 42 may be either the whole or a portion of the bonding surface 45. It is preferred that the first metal member 42 satisfy the preferable conditions of the first metal member in the one embodiment of the bonded assembly of the present invention.

As a method of causing carbon to enter the first metal member 42 from the first bonding surface 45 thereof to form the high carbon concentration region 44 at a depth of the first metal member 42 ranging from 0.3 to 2.0 mm from the first bonding surface 45, a carburizing method is preferred. The carburizing method is a method in which steel is heated in a carburizing agent to diffuse carbon from the surface of the steel to the inside and thereby increase a carbon content in the steel. Examples of the carburizing method include a vacuum carburizing method, a direct carburizing method, a plasma carburizing method, a nitrogen base method, a cracked gas method, and a converted gas method. Of these, a vacuum carburizing method is preferred because it can prevent oxidation of the first metal member. The vacuum carburizing method is a carburizing method in which steel is put steel in a vacuum electric furnace, the vacuum electric furnace is evacuated, the resulting vacuum electric furnace is filled with a carburizing agent, and it is heated at from 500 to 1200° C. for from 0.1 to 3.5 hours. The carburizing treatment followed by further heating at from 200 to 1200° C. for from 1 to 5 hours is more preferred. This makes it possible to increase the surface carbon concentration and at the same time, allow deep penetration of carbon. As the carburizing agent, $C_3H_8$, $C_4H_{10}$, C₂H₂, or the like is preferably used. In carburization of the first metal member, it is preferred to expose the first bonding surface and attach a protective film to the other surface to permit penetration of carbon from only the first bonding surface. When carbon is caused to enter the first metal member 42 from a portion of the first bonding surface 45 thereof, a protective film is preferably attached to a portion of the bonding surface 45 into which penetration of carbon is not desired.

The thickness and carbon concentration of the high carbon concentration region can be controlled by the concentration of the carburizing agent, temperature during carburization, and carburization time.

Next, as shown in FIG. 6, the first metal member 42 and a second metal member 43 having a second bonding surface 46 and containing a tungsten carbide-based super hard alloy are laminated one after another. The first metal member 42 and the second metal member 43 are laminated so as to face the first bonding surface 45 and the second bonding surface 46 to each other while having therebetween a ""brazing filler metal" (copper foil) 37 capable of penetrating through the first metal member 42 or the second metal member 43". Then, the lamination of the first metal member 42 and the second metal member 43 is pressed under pressure of from 0.1 to 5 MPa at a temperature of from 700 to 1200° C. Thus, the first metal member 42 and the second metal member 43 are bonded to each other while allowing the brazing filler metal (copper foil) 47 to penetrate into the first metal member 42 or the second metal member 43 to produce a bonded assembly. The second metal member 43 preferably satisfies the preferable conditions of the second metal member in the one embodiment of the bonded assembly of the present invention.

As the brazing filler metal, that using a material which smoothly penetrates into at least one of the first metal member 42 and the second metal member 43 is preferred. More specifically, a "brazing filler metal" composed of a metal (an alloy when it is composed of two or more metals) containing at least one selected from the group consisting of cobalt (Co), copper (Cu), silver (Ag), gold (Au), nickel (Ni), and aluminum (Al). Although the thickness of the brazing filler metal is not particularly limited, it is preferably from 0.1 to 200 μm, more preferably from 1 to 50 μm so as to secure good penetration through at least one of the first metal member 42 and the second metal member 43. The thickness less than 0.1 μm may not achieve sufficient bonding strength. The brazing filler metal having a thickness greater than 200 μm may fail to penetrate into the metal member. A copper content in the copper foil is preferably from 46 to 100 mass %, more preferably from 70 to 100 mass %. When the copper content in the copper foil is less than 100 mass %, the copper foil further containing an additive such as palladium (Pd), silicon (Si), tin (Sn), phosphorus (P), manganese (Mn), zinc (Zn), titanium (Ti), niobium (Nb), or boron (B) is preferred. In the process of producing a bonded assembly according to the present invention, the term "copper foil" embraces the above-mentioned copper alloy foil.

The heating temperature when the first metal member and the second metal member are laminated one after another (overlapped with each other) with the "brazing filler metal" sandwiched therebetween, heated, and pressed (bonded) is from 700 to 1200° C., preferably from 900 to 1150° C. The heating temperature less than 700° C. is not preferred because it cannot achieve sufficient bonding strength. The heating temperature greater than 1200° C. is also not preferred because it deteriorates the first metal member and the second metal member. The pressure applied to bond the first metal member and the second metal member is from 0.1 to 5 MPa, preferably from 0.5 to 3 MPa. The pressure less than 0.1 MPa is not preferred because cannot achieve sufficient bonding strength. The pressure greater than 5 MPa is also not preferred because it deforms the first metal member and the second metal member and thereby reduces the preciseness of the bonded assembly. Upon bonding, the pressure is preferably applied to a direction which is perpendicular to the first bonding surface 45 of the first metal member 42 and in which the first metal member 42 and the second metal member 43 are pressed against each other. As a method of applying a pressure to the first metal member 42 and the second metal member 43, a method of applying a pressure by using vacuum hot press can be used.

The bonding time (retention time under the above-mentioned temperature and pressure conditions) is preferably from 1 minute to 1 hour, more preferably from 5 minutes to 45 minutes. Bonding time less than 1 minute may lead to deteriorated bonding strength, while bonding time greater than 1 hour may deteriorate the first metal member and the second metal member, leading to deterioration in mechanical properties. The atmosphere upon bonding is preferably vacuum or an inert gas atmosphere. Degree of vacuum (Pa: absolute pressure) is preferably 1 Pa or less, more preferably 0.1 Pa or less, particularly preferably 0.01 Pa or less. In order to retain the metal members under the above predetermined temperature and pressure conditions, heating using a vacuum hot press bonding furnace or the like is preferred.

After the first metal member and the second metal member are laminated one after another with the "brazing filler metal" therebetween and then, bonded under heating and pressure, it is cooled to 500° C. or less at an average cooling rate of from 1 to 50° C./min to obtain a bonded tungsten carbide-based super hard alloy assembly. Cooling is conducted to 500° C. or less preferably at a rate ranging from 1 to 50° C./min, more preferably from 4 to 10° C./min. When the cooling rate is greater than 50° C./min, the bonded members are likely to separate due to reduction in the bonding strength. The cooling rate smaller than 1° C./min makes it difficult to obtain a good texture and the resulting bonded assembly inevitably has deteriorated mechanical properties (hardness, toughness) and deteriorated corrosion resistance.

When the first metal member and the second metal member are bonded by the above-mentioned method, the brazing filler metal penetrates into the first metal member or the second metal member. As a result, a bonded assembly (the bonded assembly of the present invention) in which the first metal member and the second metal member have been directly bonded to each other (the first bonding surface and the second bonding surface have been brought into direct contact (directly bonded) can be obtained.

(3-2) A Process for Producing a Second Bonded Tungsten Carbide-Based Super Hard Alloy Assembly One embodiment of the process for producing a bonded tungsten carbide-based super hard alloy assembly (second bonded tungsten carbide-based super hard alloy assembly) according to the present invention will next be described. In the process for producing a bonded tungsten carbide-based super hard alloy assembly according to the present embodiment, carbon is caused to enter a first metal member from at least a portion of a first bonding surface thereof. The first metal member has the first bonding surface and is comprised of a steel material containing a martensite structure and further containing at least one element selected from the group consisting of Ti, Nb, Mo, Ta, V, W, and Zr. By this step, a high carbon concentration region having a maximum carbon concentration of from 0.35 to 1.7 mass % is formed at a depth of the first metal member ranging from 0.3 to 2.0 mm from the first bonding surface. The first metal member and a second metal member having a second bonding surface and comprised of a tungsten carbide-based super hard alloy are laminated one after another so that the first bonding surface and the second bonding surface face to each other "while having therebetween a brazing filler metal capable of penetrating into the first metal member or the second metal member". The resulting lamination of the first metal member and the second metal member is pressed under pressure of from 0.1 to 5 MPa at a temperature of from 700 to 1200° C., whereby the first metal member and the second metal member are bonded to each other while causing the brazing filler metal to penetrate into the first metal member or the second metal member. Then, the lamination (bonding) of the first metal member and the second metal member is cooled to 500° C. or less at an average cooling rate of from 1 to 50° C./min to produce a bonded tungsten carbide-based super hard alloy assembly.

The process for producing a bonded tungsten carbide-based super hard alloy assembly (second bonded tungsten carbide-based super hard alloy assembly) according to the present embodiment will hereinafter be called "second production process". The above-mentioned process for producing a bonded tungsten carbide-based super hard alloy assembly (first bonded tungsten carbide-based super hard alloy assembly) will hereinafter be called "first production process". The "second production process" is different from the "first production process" in that the steel material contains a martensite structure and further contains at least one element selected from the group consisting of Ti, Nb, Mo, Ta, V, W, and Zr. Moreover, the "second production process" is different from the "first production process" in that the maximum carbon concentration in the high carbon concentration of the first metal member is from 0.35 to 1.7 mass %. The process for producing a bonded tungsten carbide-based super hard alloy assembly according to the present embodiment can therefore produce the second bonded tungsten carbide-based super hard alloy assembly.

(4) A Process for Producing a Honeycomb Body Forming Die

Next, a process for producing one embodiment of the honeycomb body forming die of the present invention as shown in FIGS. 2 to 5 will be described.

It is preferred to form, in a first plate-shaped member 22, back holes 24 extending in the thickness direction thereof and opening at both end faces. The back holes 24 are preferably formed at intersections of "slits 25 of a second plate-shaped member 23" which will be formed later. In the production of the honeycomb body forming die 100 of the present embodiment, the back holes 24 are formed so that "in the honeycomb body forming die 100 thus obtained, they are placed at every other intersection of the intersections of the slits 25 formed in lattice form". The back holes 24 are preferably formed in parallel to each other in the thickness direction of the first plate-shaped member 22. A method of forming the back holes is not particularly limited but known methods using electrochemical machining (ECM), electrical discharge machining (EDM), laser processing, or machine processing with a drill or the like are suited. The first plate-shaped member (first metal member) 22 is comprised of the following "stainless steel" or "steel material". The "stainless steel" is a stainless steel containing a martensite structure and having an average carbon concentration of from 0.10 to 0.40 mass %. Alternatively, the "steel material" contains a martensite structure and further contains "at least one element selected from the group consisting of Ti, Nb, Mo, Ta, V, W, and Zr".

In the process for producing a honeycomb body forming die according to the present embodiment, it is also possible to form the back holes not in the step (1) but in a step thereafter, for example, a step after bonding the first plate-shaped member and the second plate-shaped member to each other.

Next, the first plate-shaped member 22 and the second plate-shaped member 23 containing a tungsten carbide-based super hard alloy (super hard alloy) are laminated one after another with a "brazing filler metal" therebetween. The lamination of the first plate-shaped member 22 and the second plate-shaped member 23 is pressed under a pressure of from 0.1 to 5 MPa at a temperature of from 700 to 1200° C. As a result, the first plate-shaped member and the second shaped-member are bonded to each other (step (2)). With the brazing filler metal diffused in the first plate-shaped member, the first plate-shaped member and the second plate-shaped member are bonded firmly to each other directly. When they are laminated, one of the surfaces of the first plate-shaped member 22 (first bonding surface) and one of the surfaces of the second plate-shaped member 23 (second bonding surface) are positioned so as to face to each other. The "brazing filler metal" is then placed between the first plate-shaped member and the second-shaped member.

The "brazing filler metal" preferably satisfies the preferable conditions of the "brazing filler metal" used in the process for producing a bonded assembly according to the present invention.

Temperature, pressure, and time conditions when the first plate-shaped member and the second plate-shaped member are bonded to each other are, respectively, similar to those when the first metal member and the second metal member are bonded to each other in the one embodiment of the process for producing a bonded assembly according to the present invention.

In the method of producing a honeycomb body forming die according to the present embodiment, the first plate-shaped member and the second plate-shaped member are preferably retained for a predetermined time at a temperature of from 700 to 1200° C. and a pressure of from 0.1 to 5 MPa. Then, the first plate-shaped member and the second plate-shaped member thus bonded are preferably cooled to 500° C. or less at a cooling rate of from 1 to 50° C./min. This makes it possible to further suppress deformation of the honeycomb body forming die or the like.

Next, slits 25 communicated with the back holes 24 are formed from the surface of the second plate-shaped member 23 on the side opposite to the second bonding surface to obtain one embodiment of the honeycomb body forming die (honeycomb body forming die 100) according to the present invention (Step (3)).

Although the method of forming slits on the surface of the second plate-shaped member is not particularly limited, for example, a conventionally known method such as grinding with diamond grinding wheel, electrical discharge machining (EDM), or laser processing is suited. In the honeycomb body forming die 100 shown in FIG. 2, the slits 25 (formation pattern) are formed in square lattice form. In the process for producing a honeycomb body forming die according to the present embodiment, the shape of the slits 25 formed in the second plate-shaped member is not limited to the square lattice form but it may be a polygonal lattice form other than the square lattice form.

With regards to the width of the slits to be formed in the second plate-shaped member, the width of the slits is preferably adjusted to that in the one embodiment of the honeycomb body forming die according to the present invention.

EXAMPLES

The present invention will hereinafter be described more specifically by Examples. The present invention is however not limited to or by these Examples.

Example 1

First, carbon was caused to enter "a first metal member having a first bonding surface and comprised of a stainless steel (SUS403)" from the first bonding surface thereof by using a vacuum carburization method. A high carbon concentration region was thus formed at a depth of the first metal member within a range up to 0.9 mm from the first bonding surface to prepare the first metal member having the high carbon concentration region. The first metal member was a square plate with (length: 70 mm)×(width: 70 mm)×(thickness: 15 mm). The first bonding surface of the first metal member was one of the surfaces having the widest area (length×width).

In the vacuum carburization method, the first metal member was put in a vacuum electric furnace with the first bonding surface being exposed and the pressure in the vacuum electric furnace was reduced to 150 Pa or less (absolute pressure). Then, the furnace was filled with acetylene as a carburizing agent. The temperature in the electric furnace was increased to 1000° C. or greater (about 1050° C.) and was retained for 2 hours. Then, after supply of acetylene was stopped and the temperature was kept at 1000° C. or greater in vacuum for at least two hours, the temperature was reduced to room temperature by cooling. By the above-mentioned operations, carburization was conducted. Then, in order to adjust the maximum carbon concentration in the high carbon concentration region to 0.2 mass %, the first bonding surface was shaved to make the depth of the high carbon concentration region from the first bonding surface to 0.9 mm.

The high carbon concentration region formed in the first metal member lay within a depth of 0.9 mm from the first bonding surface and the maximum carbon concentration of the high carbon concentration region was 0.2 mass %. The carbon concentration of the high carbon concentration region had a concentration gradient. It was about 0.2 mass % at the first bonding surface (within a depth range of about 50 µm from the first bonding surface (a range giving the maximum carbon concentration). At a depth of 0.9 mm, the deepest position from the first bonding surface, the carbon concentration (mass %) was equivalent to the carbon concentration of a portion of the first metal member other than the high carbon concentration region. The maximum carbon concentration in the high carbon concentration region was measured using EPMA (electron probe microanalyzer). The carbon concentration of a portion of the first metal member other than the high carbon concentration region was 0.12 mass %, that is, the carbon concentration of SUS403.

Next, the first metal member and a second metal member having a second bonding surface and comprised of a tungsten carbide-based super hard alloy were laminated one after another so as to face the first bonding surface and the second bonding surface to each other with a pure copper foil (99.9%) therebetween. As the second metal member, a square plate with a size of (length: 68 mm)×(width: 68 mm)×(thickness: 2.50 mm) was used. The second bonding surface of the second metal member was one of the surfaces having the widest area (length×width).

The resulting lamination was then pressed for a predetermined time under a pressure of 1 MPa or greater at a temperature of 1000° C. or greater in such a manner as to push the first metal member and the second metal member against each other. The first metal member and the second metal member were thus bonded to each other while allowing the brazing filler metal to penetrate into the first metal member, whereby a bonded tungsten carbide-based super hard alloy assembly (first bonded tungsten carbide-based super hard alloy assembly) was obtained. Described specifically, the lamination was retained for from 15 to 45 minutes under the above-mentioned conditions, that is, at a temperature of 1100° C. and under a pressure of 1 MPA, followed by cooling to 500° C. or less at a cooling rate of about 5° C./min. The bonding operation of the first metal member and the second metal member was conducted under reduced-pressure atmosphere of 0.01 Pa or less.

With regard to the bonded tungsten carbide-based super hard alloy assembly thus obtained, the "bonding strength" between the first metal member and the second metal member was measured in the method shown below. With regard to the first metal member, "hardness" was measured by the method also shown below as an indicator of "mechanical properties" and moreover, a "Charpy impact test" was conducted. The results are shown in Table 1. In Table 1, the "depth" means a depth, from the first bonding surface, of the high carbon concentration region in the bonded tungsten carbide-based super hard alloy assembly thus obtained. In addition, the column of "material" means the material of the first metal member.

(Measuring Method of Bonding Strength)

The bonded tungsten carbide-based super hard alloy assembly thus obtained (about 70 mm×70 mm×17.5 mm) is heated to about 350° C. and a thermal stress due to a difference in thermal expansion coefficient between the first metal member and the second metal member is applied. The separation between the members at this time is observed using a supersonic flaw imaging apparatus. In Table 1, "none" means that no separation occurred; "minute separation" means that separation occurred in an area of less than 10% (except "none") of the whole bonded area; "small separation" means that separation occurred in an area of from 10 to 30% of the whole bonded area; and "large separation" means that separation occurred in an area exceeding 50% of the whole bonded area. "None" and "minute separation" mean that the corresponding bonded assembly passes the impact test, while "small separation" and "large separation" mean that the corresponding bonded assembly does not pass the test.

(Measurement Method of Hardness)

A specimen (10 mm×10 mm×17.5 mm) was cut out from the center portion of the resulting bonded tungsten carbide-based super hard alloy assembly (about 70 mm×70 mm×17.5 mm) in such a manner as to expose the cross-section of the bonded portion and the cross-section was polished. The hardness of the polished cross-section of the first metal member in the vicinity of the bonded interface (within a range of 2 mm from the bonded interface) was measured. The specimen having Hv of 350 or greater in the whole region was judged "good"; the specimen having a region with Hv of less than 350 within a range of less than 0.2 mm (except the case where Hv was 350 or greater in the whole region) was judged "fair"; and the specimen having Hv of less than 350 within a range of 0.2 mm or greater was judged "poor". At the same time, the texture of the polished cross-section of the bonded portion was also observed and it was confirmed whether the metal texture in the whole region of the first metal member had a problem or not (whether or not the metal texture was comparable to the conventional texture). As the hardness, Vickers hardness (Hv) was measured. For the measurement of the hardness, "MVK-G1", product of Akashi Seisakujo was used.

Charpy Impact Test

A rectangular parallelepiped of 10 mm×10 mm×55 mm is cut out from the first metal member of the resulting bonded tungsten carbide-based super hard alloy assembly and it is provided as a specimen. Then, a V-shaped (the shape of a cross-section perpendicular to the longer direction of a notch (the extending direction of the notch) is V-shaped) notch having a depth of 2 mm is formed so as to extend in a direction perpendicular to the longer direction at a center portion, in the longer direction, of the side surface (surface of 10 mm×55 mm) of the specimen. The V-shaped notch has, at the bottom portion thereof, an angle of 45° (angle of "V" shape). Next, impact is added to the center portion, in the longer direction, of the specimen with a hammer having a mass of 50 kg, while retaining the specimen at both ends thereof and the specimen is fractured. At this time, the hammer is caused to collide (caused to collide from the back surface of the V-shaped notch) against the specimen on the side of the surface opposite to the surface (surface parallel to the surface having a V-shaped groove therein) where the V-shaped groove has been formed. The hammer attached to one of the tips a rod is caused to collide against the specimen while turning it like a pendulum with the other tip of the rod as a center. A quotient obtained by dividing the absorption energy upon fracture of the specimen by the cross-sectional area (area of a cross-section perpendicular to a longer direction) of the specimen is designated as Charpy impact strength ($J/cm^2$). A difference between the potential energy at the position (height) of the hammer before it is brought down and the potential energy at the position (height) of the hammer when it is brought up after fracture of the specimen is designated as absorption energy upon fracture of the specimen. The specimen having a Charpy impact strength of 10 ($J/cm^2$) or greater passes the test.

TABLE 1

| | | | High carbon concentration region | | | | |
|---|---|---|---|---|---|---|---|
| | Material | Bonded area ($mm^2$) | Depth (mm) | Maximum carbon concentration (mass %) | Hardness | Charpy impact strength ($J/cm^2$) | Bonding strength |
| Example 1 | SUS403 | 19600 | 1.2 | 0.30 | Good | 10 or greater | None |
| Example 2 | SUS403 | 35900 | 1.0 | 0.35 | Good | 10 or greater | None |
| Example 3 | SUS403 | 122000 | 0.9 | 0.45 | Good | 10 or greater | None |
| Example 4 | SUS403 | — | 1.3 | 0.40 | Good | 10 or greater | None |
| Example 5 | SUS403 | — | 1.2 | 1.10 | Fair | 10 or greater | None |
| Example 6 | SUS403 | — | 2.0 | 1.00 | Fair | 10 or greater | None |
| Example 7 | SUS403 | — | 0.7 | 1.00 | Fair | 10 or greater | None |
| Example 8 | SUS403 | — | 1.5 | 0.40 | Good | 10 or greater | None |
| Example 9 | SUS403 | — | 0.7 | 0.30 | Good | 10 or greater | Minute separation |
| Comp. Ex. 1 | SUS403 | — | 0.6 | 0.25 | Good | 10 or greater | Small separation |
| Comp. Ex. 2 | SUS403 | — | 2.0 | 1.30 | Poor | 10 or greater | None |
| Comp. Ex. 3 | SUS403 | — | 0.9 | 1.50 | Poor | 10 or greater | None |

TABLE 2

| | | | High carbon concentration region | | | | |
|---|---|---|---|---|---|---|---|
| | Material | Element added | Depth (mm) | Maximum carbon concentration (mass %) | Hardness | Charpy impact strength ($J/cm^2$) | Bonding strength |
| Example 10 | Hot work tool steel D | Mo, V | 0.9 | 1.45 | Good | 10 or greater | None |
| Example 11 | Hot work tool steel O | Mo, V | 1.0 | 0.55 | Good | 10 or greater | None |
| Example 12 | SUH600 | Nb, Mo, V | 0.9 | 1.30 | Good | 10 or greater | None |
| Example 13 | SUH601 | Nb, Mo, V | 1.2 | 1.70 | Fair | 10 or greater | None |
| Comp. Ex. 4 | SUH602 | Nb, Mo, V | 0.6 | 0.40 | Good | 10 or greater | Large separation |
| Comp. Ex. 5 | Hot work tool steel O | Mo, V | 0.6 | 0.60 | Good | 10 or greater | Large separation |

Examples 2 to 13

Comparative Examples 1 to 5

In a similar manner to Example 1 except that any of the "material" of the first metal member, elements added, and the depth and the maximum carbon concentration of the high carbon concentration region was changed as shown in Table 1 or 2, bonded tungsten carbide-based super hard alloy assemblies were produced. The resulting bonded tungsten carbide-based super hard alloy assemblies were measured for their "bonding strength" in a similar manner to Example 1. In addition, measurement of "hardness" and "Charpy impact test" of the first metal member were conducted using the above-mentioned methods, respectively. The results are shown in Tables 1 and 2. The bonded tungsten carbide-based super hard alloy assemblies obtained in Examples 2 to 9 are first bonded assemblies and the bonded tungsten carbide-based super hard alloy assemblies obtained in Examples 10 to 13 are second bonded assemblies.

The bonded assemblies of Comparative Examples 1, 4, and 5 are those obtained without carburization treatment. The bonded assemblies of Comparative Examples 2 and 3 are those having, in the high carbon concentration region of the first metal member thereof, an excessively high maximum carbon concentration as a result of carburization treatment.

It has been found from Tables 1 and 2 that a bonded tungsten carbide-based super hard alloy assembly having a first metal member with high hardness and having a high bonding strength can be obtained when the high carbon concentration region of the first metal member has a depth of 0.70 mm or greater. It has also been found that the bonded tungsten carbide-based super hard alloy assemblies obtained in Examples 1 to 9 have high hardness and at the same time, have high bonding strength when the high carbon concentration region of the first metal member has the maximum carbon concentration of from 0.3 to 1.2 mass %. In Examples 1 to 9, the martensite structure-containing steel material constituting the first metal member is a stainless steel. When the martensite structure-containing steel material constituting the first metal member contains an element such as Nb, Mo, or V, the following results are obtained. In short, a bonded tungsten carbide-based super hard alloy assembly having the maximum carbon concentration, in the high carbon concentration region of the first metal member, of from 0.55 to 1.7 mass has high hardness and at the same time, shows high bonding strength.

INDUSTRIAL APPLICABILITY

The bonded tungsten carbide-based super hard alloy assembly according to the present invention can be used suitably as honeycomb body forming dies, precision molds, dies, or the like. The process for producing a bonded assembly according to the present invention can be used for the production of the bonded assembly of the present invention.

DESCRIPTION OF REFERENCE NUMERALS

1: Bonded tungsten carbide-based super hard alloy assembly, 2: first metal member, 3: second metal member, 4: high carbon concentration region, 5: first bonding surface, 6: second bonding surface, 21: bonded tungsten carbide-based super hard alloy assembly, 22: first plate-shaped member, 23: second plate-shaped member, 24: back hole, 25: slit, 28: columnar portion, 29: cell block, 42: first metal member, 43: second metal member, 44: high carbon concentration region, 45: first bonding surface, 46: second bonding surface, 47: copper foil, 51: cell, 52: partition wall, 100: honeycomb body forming die, 200: honeycomb body.

The invention claimed is:

1. A bonded tungsten carbide-based super hard alloy assembly comprising:
    a first metal member comprising a steel material containing a martensite structure in an amount of 20 mass % or greater and having a first bonding surface; and
    a second metal member comprising a tungsten carbide-based super hard alloy and having a second bonding surface that is directly bonded to the first bonding surface of the first metal member;
    wherein the first metal member is a first plate-shaped member having therein a back hole defining as a through-hole for introducing a forming raw material and the second metal member is a second plate-shaped member having slits in lattice form communicating with the back hole for forming the forming raw material into a honeycomb shape;
    wherein the martensite structure-containing steel material constituting the first metal member is a stainless steel having an average carbon concentration of 0.10 to 0.40 mass %; and
    wherein the first metal member has, at a depth thereof ranging from 0.70 to 3.00 mm from the first bonding surface, a high carbon concentration region having a carbon concentration that is higher than the average carbon concentration of the martensite structure-containing steel material constituting the first metal member, the high carbon concentration region having a maximum carbon concentration of 0.3 to 1.2 mass %.

2. A honeycomb body forming die comprising the bonded tungsten carbide-based super hard alloy assembly as claimed in claim 1.

3. The bonded tungsten carbide-based super hard alloy assembly according to claim 1, wherein the martensite structure-containing steel material constituting the first metal member is a stainless steel having an average carbon concentration of 0.10 to 0.20 mass %.

4. A bonded tungsten carbide-based super hard alloy assembly comprising:
    a first metal member comprising a steel material containing a martensite structure in an amount of 20 mass % or greater and having a first bonding surface; and
    a second metal member comprising a tungsten carbide-based super hard alloy and having a second bonding surface that is directly bonded to the first bonding surface of the first metal member;
    wherein the first metal member is a first plate-shaped member having therein a back hole defining a through-hole for introducing a forming raw material and the second metal member is a second plate-shaped member having slits in lattice form communicating with the back hole for forming the forming raw material into a honeycomb shape;
    wherein the martensite structure-containing steel material constituting the first metal member further contains at least one element selected from the group consisting of Ti, Nb, Mo, Ta, V, W, and Zr; and
    wherein the first metal member has, at a depth thereof ranging from 0.70 to 3.00 mm from the first bonding surface, a high carbon concentration region having a carbon concentration that is higher than an average carbon concentration of the martensite structure-containing steel material constituting the first metal member, the high carbon concentration region having a maximum carbon concentration of 0.55 to 1.7 mass %.

5. A honeycomb body forming die comprising the bonded tungsten carbide-based super hard alloy assembly as claimed in claim 4.

6. A process for producing a bonded tungsten carbide-based super hard alloy assembly, comprising:
causing carbon to enter a first metal member, which has a first bonding surface and comprises a stainless steel containing a martensite structure in an amount of 20 mass % or greater and having an average carbon concentration of 0.10 to 0.40 mass %, from at least a portion of the first bonding surface of the first metal member to form a high carbon concentration region having a carbon concentration that is higher than an average carbon concentration of the martensite structure-containing material of the first metal member, the carbon concentration of the high carbon concentration region having a maximum carbon concentration of 0.3 to 1.2 mass % at a depth of the first metal member ranging from 0.7 to 3.00 mm from the first bonding surface thereof;
laminating the first metal member and a second metal member having a second bonding surface and comprising a tungsten carbide-based super hard alloy, one after another, so that the first bonding surface and the second bonding surface face each other while inserting therebetween a brazing filler metal capable of penetrating the first metal member or the second metal member;
pressing the laminated members under a pressure of 0.1 to 0.5 MPa at a temperature of 700 to 1200° C. to directly bond the first metal member and the second metal member to each other while allowing the brazing filler metal to penetrate into the first metal member or the second metal member; and
then cooling to 500° C. or less at an average cooling rate of 1 to 50° C./min to produce the bonded tungsten carbide-based super hard alloy assembly,
wherein the first metal member is a first plate-shaped member having therein a back hole defining as a through-hole for introducing a forming raw material and the second metal member is a second plate-shaped member having slits in lattice form communicating with the back hole for forming the forming raw material into a honeycomb shape.

7. A process for producing a bonded tungsten carbide-based super hard alloy assembly, comprising causing carbon to enter a first metal member, which has a first bonding surface and comprises a steel material containing a martensite structure in an amount of 20 mass % or greater and further contains at least one element selected from the group consisting of Ti, Nb, Mo, Ta, V, W, and Zr, from at least a portion of the first bonded surface of the first metal member to form a high carbon concentration region having a carbon concentration that is higher than an average carbon concentration of the martensite structure-containing material of the first metal member, the carbon concentration of the high carbon concentration region having a maximum carbon concentration of 0.55 to 1.7 mass % at a depth of the first metal member ranging from 0.7 to 3.00 mm from the first bonding surface;
laminating the first metal member and a second metal member having a second bonding surface and comprising a tungsten carbide-based super hard alloy one after another so that the first bonding surface and the second bonding surface face to each other while inserting therebetween a brazing filler metal capable of penetrating through the first metal member or the second metal member;
pressing the laminated members under a pressure of 0.1 to 0.5 MPa at a temperature of 700 to 1200° C. to directly bond the first metal member and the second metal member to each other while allowing the brazing filler metal to penetrate into the first metal member or the second metal member; and
then cooling to 500° C. or less at an average cooling rate of 1 to 50° C./min to produce the bonded tungsten carbide-based super hard alloy assembly,
wherein the first metal member is a first plate-shaped member having therein a back hole defining a through-hole for introducing a forming raw material and the second metal member is a second plate-shaped member having slits in lattice form communicating with the back hole for forming the forming raw material into a honeycomb shape.

* * * * *